United States Patent [19]
Fanciullo et al.

[11] 3,907,599
[45] Sept. 23, 1975

[54] FLAT BATTERY

[75] Inventors: Ralph D. Fanciullo, Waltham; Ludwig G. Fasolino, Wellesley, both of Mass.

[73] Assignee: Polaroid Corporation, Cambridge, Mass.

[22] Filed: June 10, 1974

[21] Appl. No.: 478,061

[52] U.S. Cl. ............................................... 136/111
[51] Int. Cl. ......................................... H01m 21/00
[58] Field of Search ............ 136/111, 175, 131–133, 136/108, 107

[56] References Cited
UNITED STATES PATENTS

| | | | |
|---|---|---|---|
| 2,666,802 | 1/1954 | Woodring et al. | 136/111 |
| 3,607,430 | 9/1971 | Glover | 136/111 |
| 3,741,814 | 6/1973 | Bilhorn | 136/111 |

*Primary Examiner*—Anthony Skapars
*Attorney, Agent, or Firm*—Gerald L. Smith

[57] ABSTRACT

A thin battery of the Le Clanche type incorporating a multiplicity of electrically conductive layers arranged to cooperate in conjunction with electrochemical material to form a multicell battery. Continuous frame-type sheet seals are thermally bonded to the periphery of each of the conductive layers to provide an insulative sealing arrangement. The outer peripheries of these frames also are heat sealed to provide a rigid, secure border seal for the battery assembly. Sheet separators are positioned intermediate superpositioned ones of the electrically conductive layers and extend beyond openings within the frame-type seals.

16 Claims, 5 Drawing Figures

FLAT BATTERY

BACKGROUND

The development of highly automated cameras capable of being folded into a thin, compact shape suited for convenient carrying as described, for instance, in U.S. Pat. Nos. 3,750,551; 3,744,385; 3,731,608; and 3,714,879 has generated a corresponding requirement for a relatively inexpensive disposable battery power supply. To provide the somewhat specialized power requirements for the instrumentalities of the camera while at the same time maintaining requisite compactness, a flat, multicell primary battery is required which exhibits a low internal impedance to produce a relatively high current output for powering motor driven film processing and reflex optics cocking assemblies along with shutter control features. During this powering activity, the battery is called upon to maintain predetermined voltage levels required to operate integrated logic control circuits.

For purposes of consumer convenience as well as the maintenance of the requisite compactness of the camera system, as described in U.S. Pat. No. 3,543,662, the flat batteries preferably are pre-packaged within a film-laden cassette assembly and generally take the area dimensional configuration of one film unit therewithin. Accordingly, a disposable power supply is combined with a disposable film cassette thereby permitting requisite compactness and thinness of the resultant camera system while assuring a continuously replenished or fresh and active power supply.

To remain practical within the above-described camera system, the multicell flat batteries must be structured to exhibit an assured or reliable shelf life concomitant with their copackaged film unit. Such reliability is mandatory inasmuch as any disfunctions on the part of the battery component of the cassette assemblage well may result in the wasting of an entire film package. When considered from the viewpoint of high volume manufacture and packaging, however, an inexpensively assembled flat laminar multicell battery format necessarily is somewhat delicate. For instance, the peripheral borders of the sheet-type electrochemically active components of the battery must both be sealed with a high degree of integrity and the electrically conductive components thereof must be protected from shorting effects and the like. Further, the overall structuring of the components of the batteries must combine or interrelate to provide both the noted output characteristics as well as a requisite shelf life. The selection of component materials, their shapes, interrelational geometries and the techniques of their practical assembly has continued to require improvement. A succession of design alterations to structure, material or assembly may remain somewhat subtle, but also may combine to achieve needed performance.

SUMMARY

The present invention is addressed to a flat battery structure of improved reliability which exhibits highly desirable shelf life characteristics. These features are gained through a particular structuring of the sheet-type components of the resultant pile as well as the arrangement for intercoupling all of these components.

An object and feature of the invention is to provide a flat battery structure generally comprised of flat, sheet-type electrically conductive electrode supporting components which are arranged in laminar fashion in combination with electrode materials, interelectrode separators and electrolyte to define a series coupled grouping of electrochemical cells. Electrically insulative frames are sealed about a select peripheral face of each of the electrode supporting components and extend therefrom to provide a border sealing portion. When the framed components of the battery structure are compiled in registry, the border seal portions correspondingly will be superpositioned in registry, whereupon they are mutually thermally intersealed, establishing a rigid periphery for the somewhat delicate laminar assemblies.

Another object and feature of the invention is to provide a laminar battery formed of discrete, sheet-type electrically conductive electrode supports having a predetermined peripheral shape and which are arranged in superpositioned fashion in combination with electrode and electrolyte materials to define one or more electrochemical cells. Electrically insulative frames, each having an opening definend by a continuous inner border, are sealed to one peripherally disposed facing surface of each of the electrode supports. The frames further are configured to extend outwardly from the electrode supports to provide a peripheral outer sealing portion. Discrete, sheet-type separators are positioned intermediate the superposed electrode supports and are shaped to extend over the noted seal extant between the electrode support and the frame. All of the sheet-type elements are superpositioned such that the extended portion of the frames are thermally intersealed to assure the liquid retaining and insulative integrity of the various components of the battery. In a preferred arrangement of the invention, the frames are formed of polyvinyl chloride, while the separators are formed of an electrolyte impregnable paper, for instance, Kraft paper.

Other objects of the invention will in part be obvious and will in part appear hereinafter.

The invention accordingly comprises the product possessing the construction, combination of elements and arrangement of parts which are exemplified in the following detailed disclosure.

For a fuller understanding of the nature and objects of the invention, reference should be had to the following detailed description taken in conjunction with the accompanying drawings.

DETAILED DESCRIPTION

Figure 1:
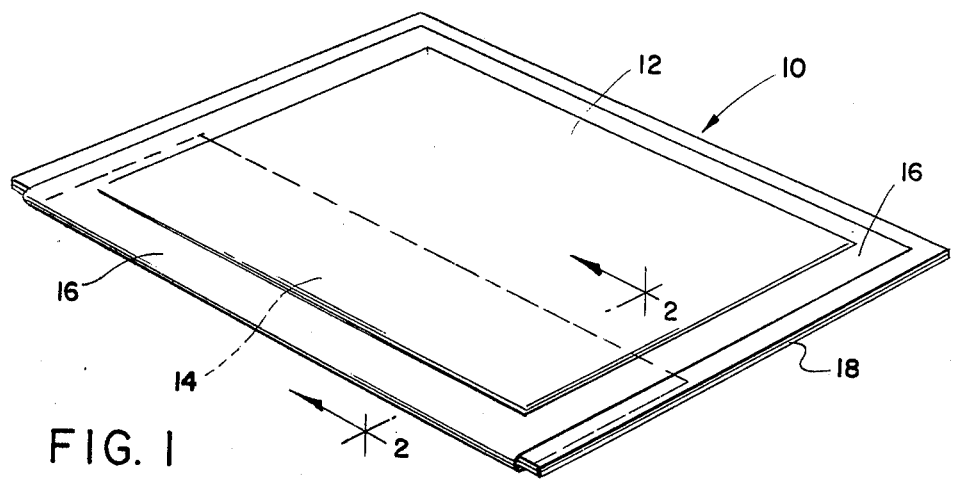
FIG. 1 is a perspective view of a flat primary battery structure according to the invention.

A multicell flat battery structure is presented generally at 10 in FIG. 1 as it would appear in an electrochemically active state following component build-up and prior to final packaging. Features of the battery structure apparent from this perspective view include an upwardly disposed anode electrode current collector assembly 12, the outwardly facing surface 14 of which is fashioned of metal to provide a terminal defining surface. Current collector assembly 12 is folded about one side of battery structure 10 such that its terminal defining surface portion is located on the lower side of the battery. A cathode electrode collector assembly (shown in FIGS. 2 and 3) is provided as the lower component of the battery, accordingly, cathode and anode terminals may be provided in convenient adjacency on one flat surface of the pile assembly. The slightly depressed peripheral portion 16 of the assembly is occasioned from peripheral sealing procedures provided during a step of assembly. This depression necessarily becomes more exaggerated in the sectional views of the battery. Extending from the periphery of the battery and formed in the course of the latter sealing procedure, is an outer border seal 18 formed of a plurality of frame-type sealing elements which extend inwardly from the border portions shown to select laminar elements of the battery. This lamination 18 is somewhat rigid, thereby enhancing the structural integrity of the flat battery configuration.

Figure 2:
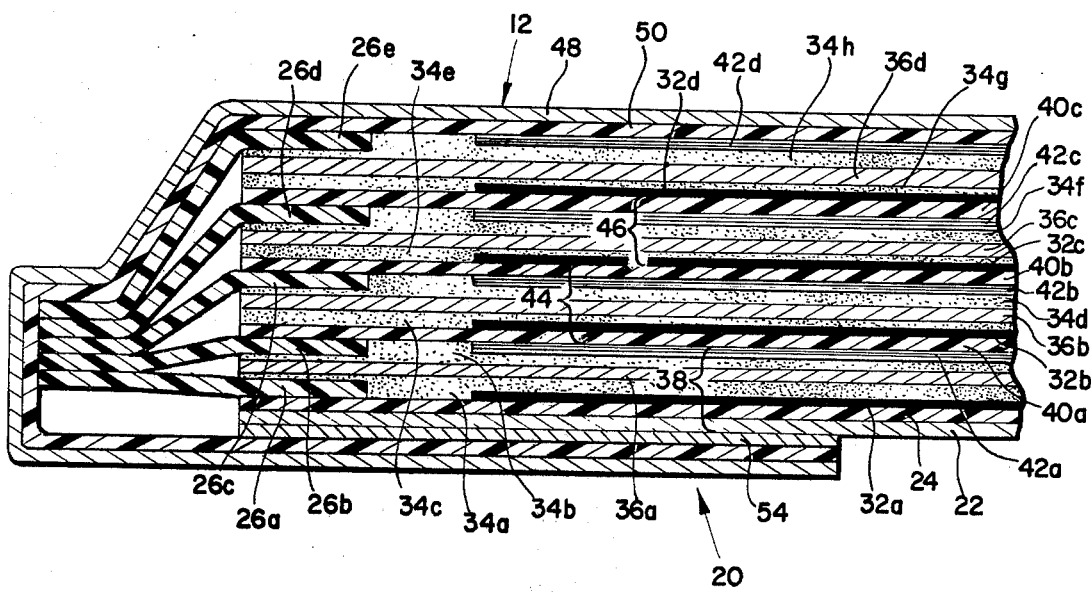
FIG. 2 is a sectional view of a battery structure according to the invention taken through the plane 2—2 of FIG. 1.
Figure 3:
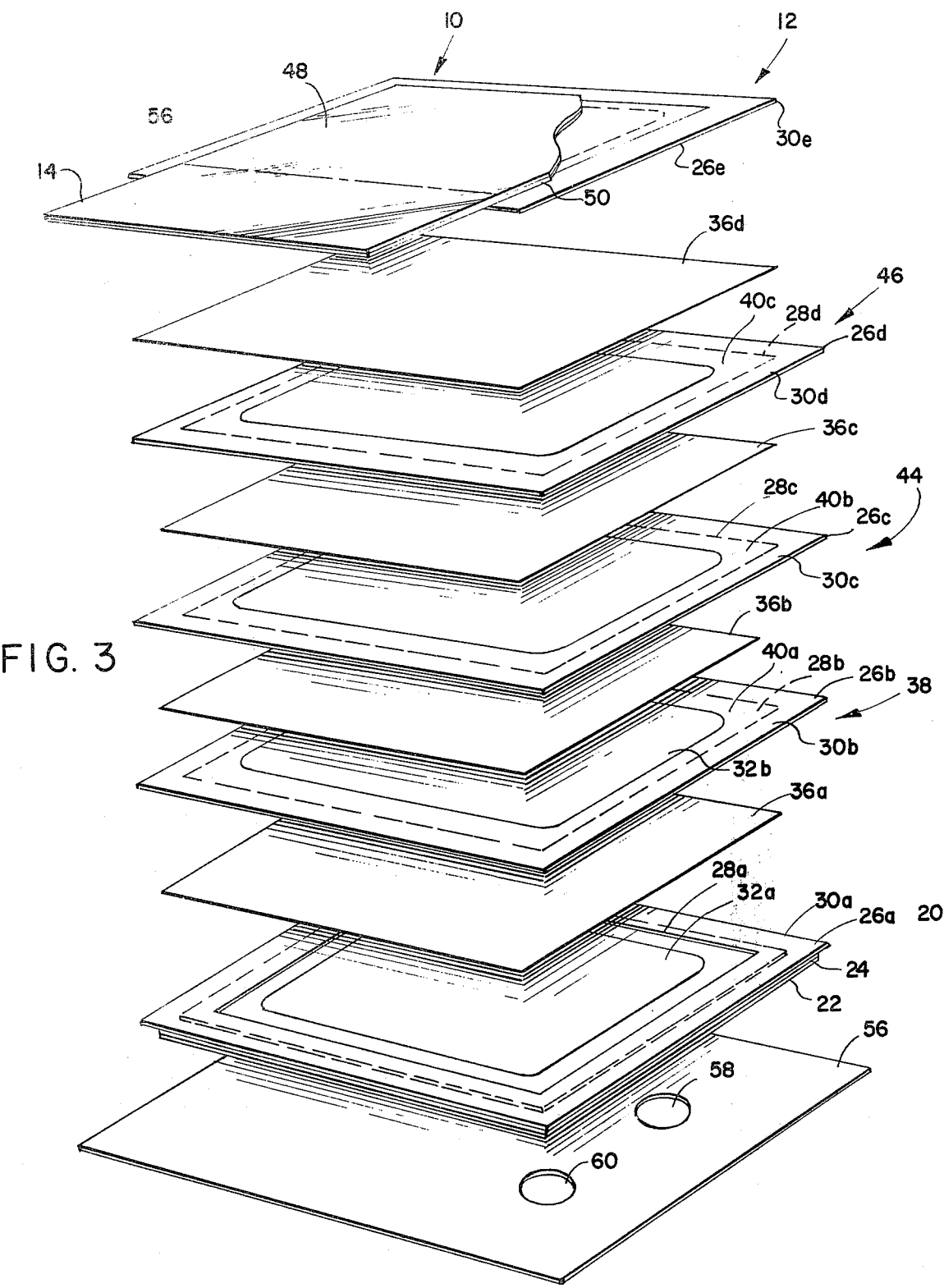
FIG. 3 is an exploded perspective representation of the components of a battery structure according to the invention, revealing the relative orientation of sheet-type components thereof.

Looking to FIGS. 2 and 3, the particular constructive features contributing to the improved shelf life characteristics of the battery are revealed in detail. Present as a Le Clanche electrochemical system, battery 10 is formed having a cathode collector assembly depicted generally at 20. Prefabricated as a discrete element of the system, assembly 20 includes a lamination formed of a metallic sheet or foil current collector 22 which, in turn, is laminated to a polymeric current collector 24. Preferably, the metal current collector is provided as an annealed tin coated steel sheet and also may be formed of aluminum or lead sheet material on the order of less than 10 mils in thickness. The polymeric current collector 40 preferably is an electrically conductive carbon-impregnated vinyl film sold under the trade designation "Condulon" having a thickness on the order of about 2 mils. Serving also as an electrode support, collector sheets as at 24 generally are impervious to electrolyte, are electrochemically inert and are characterized in exhibiting a low resistance to the flow current from one face to the opposite face thereof. Discrete assembly 20 also includes a rectangular frame 26a, the inner border 28a of which defines a rectangular inner opening exposing the upwardly facing surface of polymeric collector 24. Frame 26a is dimensioned such that it also extends beyond the periphery of polymeric collector 24 to define a border sealing portion 30a which provides oppositely disposed surfaces for final border sealing. As is noted from the drawing, frame 26a is continuous, is formed of a material heat sealable both with itself and the material of the polymeric current collector 24 and is electrolyte impervious, remaining inert to the chemical activity of the battery structure. Preferably, the frame is formed of polyvinyl chloride having a thickness of about 5 mils. In the preparation of the discrete cathode collector subassembly, the downwardly facing inner border surface of frame 26a is thermally sealed over the upwardly facing and corresponding peripheral border surface of polymeric collector 24. Preferably, the thermal seal is carried out in impulse fashion wherein the temperature of the sealed portion is raised from room temperature to about 275° F and returned to room temperature over an interval of about 15 seconds. Prior to thermal attachment, a patch of active positive material is predeposited upon the upwardly facing surface of collector 24 within an area now encompassed by inner border 28a of frame 26a. Preferably, material 32a is provided as a cathodic paste deposition formulated as a mixture of manganese dioxide (depolarizer) and electrically conductive carbon dispersed in a polymeric binder.

Over the above-described subassembly including collector layers 22 and 24, frame 26a and electrode 32a, electrolyte is applied coextensive the surface of cathode material 32a. This electrolyte ordinarily will comprise a conventional aqueous solution of ammonium chloride/zinc chloride about 4:1 dispersed in a polymeric thickener such as hydroxyethyl cellulose, etc., for example, on the order of about (5 percent) or more. In addition, a small quantity of mercuric chloride may be present in the electrolyte as a corrosion inhibitor. The electrolyte, appearing at 34a in FIG. 2 of the drawings, may be deposited over cathode 32a utilizing positive displacement techniques, doctoring, silk screening or the like.

Over the electrolyte deposition 34a, there is positioned a selectively dimensioned sheet of battery separator material. Such materials are characterized in being aqueous electrolyte permeable and electrically insulative. Preferably, the material is present as a Kraft paper having a thickness of about 2.0 mils. As is shown at 36a in FIGS. 2 and 3, separator 36a is dimensioned such that its periphery extends over the inner rectangular opening defined by inner border 28a of frame 26a. Separator 36a is dimensioned having the same peripheral shape and dimensions as polymeric collector 24.

The next subassembly in the multicell pile is a discrete intercell connector shown generally at 38 which serves also as a duplex electrode. Intercell connector 38 is prefabricated to comprise a sheet of electrically conductive polymeric material 40a, preferably a sheet of electrically conductive carbonimpregnated vinyl, for instance, the earlier described "Condulon" material or the like. Sheet 40a is configured having the identical shape as corresponding polymeric collector sheet 24. Positioned over and bonded to the peripheral downwardly disposed surface of sheet 40a is a continuous frame member 26b. Structured identically with frame 26a, frame 26b is formed having a rectangularly shaped inner opening defined by its inner border 28b and is thermally sealed along a select portion of its upper inwardly disposed surface to the corresponding downwardly facing outer surface of sheet 40a (see FIG. 2). As before, this thermal seal preferably is provided using impulse sealing technique wherein sealing temperatures are gradually raised to about 275° F and reduced to room temperature over an interval of about 15 seconds. Frame 26b is formed of polyvinyl chloride having a thickness of about 5 mils. Preformed centrally upon the lower side of sheet 40b within the inner opening of frame 26b is a distribution of active zinc negative or anode material 42a (FIG. 2) which, in conventional fashion, is amalgamated with, for instance, mercury by contact with mercuric chloride within the electrolyte of the cell. Oppositely disposed upon sheet 40a is another dry deposition of active positive material 32b which, as before, is present as a manganese dioxide/electrically conductive carbon mixture dispersed in a polymeric binder.

When positioned in registry over separator 36a and cathode collector assembly 20, discrete assembly 38 forms the first electrochemically active cell. Note in this regard, that separator 36a extends not only sufficiently to separate electrodes 32a and 42a but also is configured to provide electricaly separation of electrode supporting sheets 24 and 40a and to extend over the thermal bonding surface between each frame and its associated electrode supporting sheet. With this arrangement, no inadvertant shorting effects or the like are likely to arise.

To provide a multicellular pile structure, for instance, having four cells as illustrated in the drawings, the pile build-up, as above described, is essentially continued utilizing intercell connector units as at 44 and 46. Units 44 and 46 are structured in identical fashion as intercell connector 38. In this regard, identical numeration is utilized in conjunction with a progressive alphabetical designation to identify identical components. For instance, electrically conductive polymeric electrode supporting sheets 40b and c are structured identically as sheet 40a; separator elements 36b–36d are structured in identical fashion as separator 36a; and frames 26b–26e are structured in identical fashion as frame 26a. Further, cathode materials 32b–32d are formed of similar materials and deposited in the same fashion as cathode 32a, while anode materials 42b–42d are formed and structured in identical fashion as anode material 42a.

Following the final electrolyte deposition as at 34h (FIG. 2), the multicell subassembly is positioned to receive anode electrode current collector assembly 12. Assembly 12 is configured in somewhat similar laminar fashion as earlier described assembly 20. In this regard, assembly 12 is formed having a metallic sheet terminal surface portion preferably formed of annealed tin coated steel sheet material on the order of less than 10 mils in thickness. Sheet 48 is laminated in electrical and physical bond with a polymeric current collector sheet of electrically conductive carbonimpregnated polymeric material 50. Preferably, sheet 50 is formed of the earlier described "Condulon" material having a thickness on the order of about 7 mils. In lengthwise dimension, sheet 50 is of the same length as separators 36a–36d, electrode supports 40a–40c and polymeric collector 24. However, the widthwise dimension of the steel 48-polymeric collector 50 laminate is extended as earlier described at 14 to provide a wraparound terminal arrangement for the battery structure. Prior to wrapping portion 14 about the battery structure, however, that portion is bent or folded upwardly along the line indicated at 52 such that the outer peripheral border 30e of frame 26e is exposed for final thermal sealing of the unit. Accordingly, following the positioning of assembly 12 in appropriate registry on the pile, the entire unit is sealed together by thermally impulse sealing the juxtaposed outer border sealing positions 30a–30e. Preferably, such sealing takes place in vacuum, the peripheral thermal seal being provided, for example, by elevating the laminar arrangement to be sealed from room temperature to about 500° F and returning the sealed portions to room temperature within an interval of about 45 seconds. During this same sealing procedure, the centrally disposed electrochemically active portion of the pile structure is cooled by a water cooled pressure applying platen or the like to assure the integrity of the electrolyte disposed therewithin. The final border seal which results evidences a unique rigidity and is considered to contribute to the significant shelf life evidenced by batteries constructed as described.

Following the final sealing procedure, extended portion 14 is folded downwardly about the completed cell structure as shown in FIG. 2 and positioned against the outwardly facing surface of metal current collector 22. However, to insulate portion 14 from collector 22, an electrically insulative sheet 54 is interposed therebetween. This sheet 54 may be present as a pressure sensitive tape.

Battery 10 is finally packaged by positioning assembly 20 over the face of a cardboard element as at 56 having apertures 58 and 60 formed therein. Apertures 58 and 60, respectively, are located so as to provide terminal access to cathode collector assembly 20 and portion 14 of anode electrode current collector assembly 12. Accordingly, the surface contact terminals of the assembly are conveniently positioned in adjacency on one side of the battery unit 10. Following the positioning of the battery unit 10 upon card 56, an electrically insulative film having an electrically insulative adhesive coated thereon is applied over the top of the assembly to finally package the unit. Of course, a variety of packaging techniques are available for use with the structure of the invention. It may be noted that in the description of the structure above, no specific venting arrangement has been provided. The battery units as above described, have been found to perform in the absence of such predesigned venting, outgassing of any developed hydrogen perhaps occurring through the intersealed frames 26a–26e.

Figure 4:
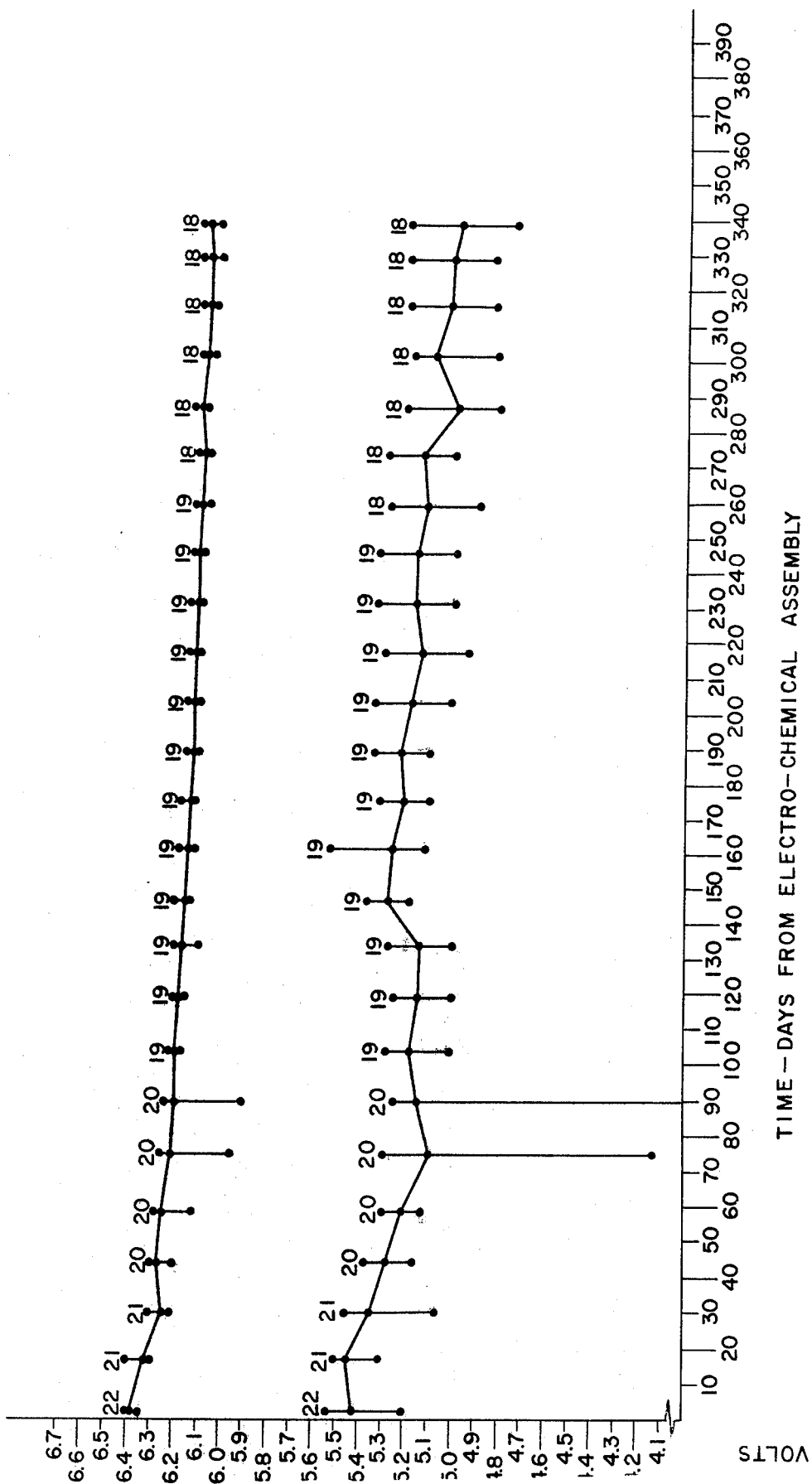
FIGS. 4 and 5 are charts relating both closed circuit voltage and open circuit voltage readings of two lots or groupings of batteries constructed according to the invention, the reading having been taken over an extended period to determine shelf life characteristics.
Figure 5:
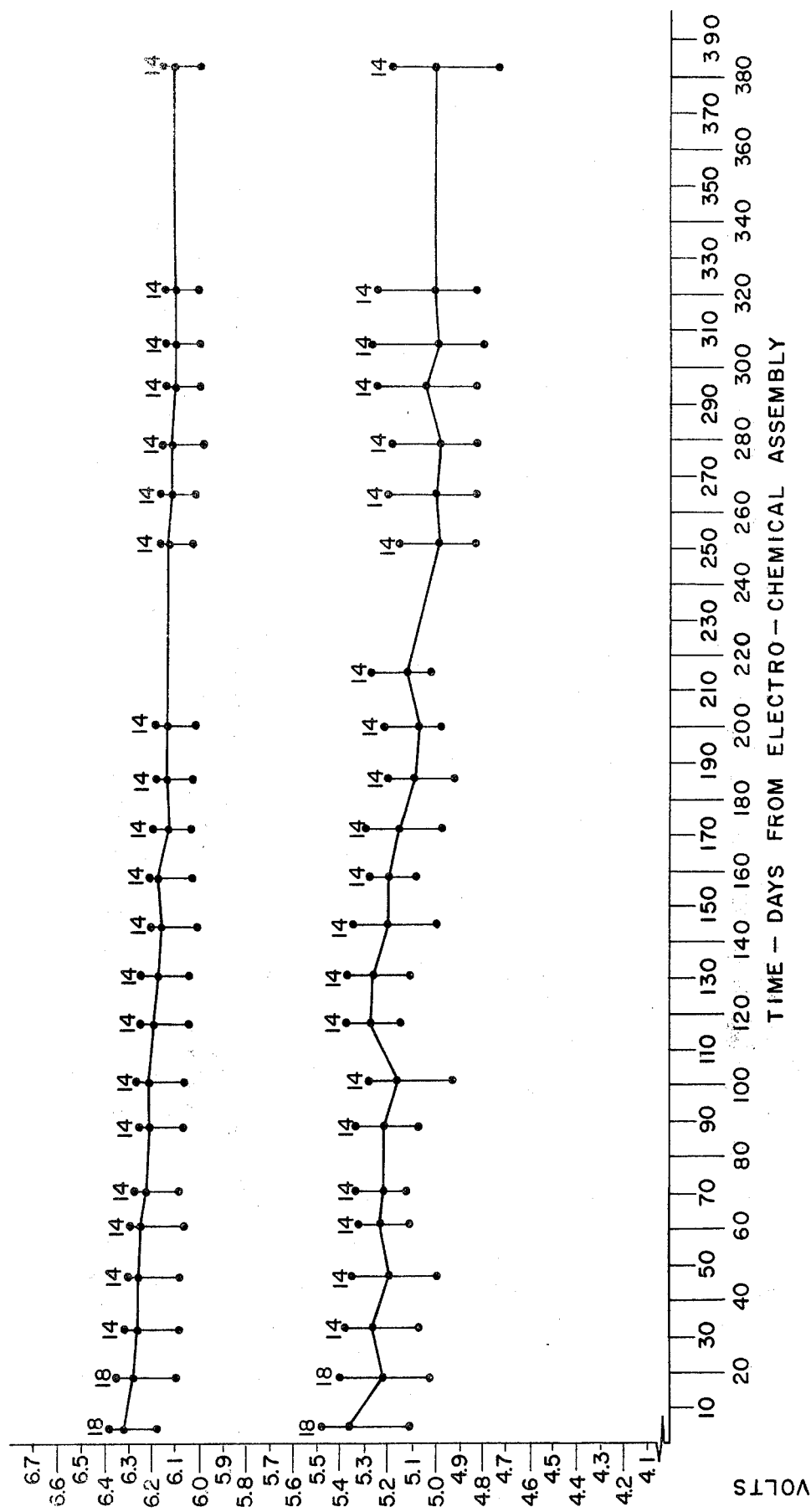

FIGS. 4 and 5 provide shelf life data, respectively, for a lot of 18 and a lot of 22 batteries constructed in accordance with the invention. The uppermost one of the curves in each of the figures plots open circuit voltage (O.C.V.) with respect to the time in days from the formation of the batteries as an electrochemically active assembly. The lowermost curve in each of the figures represents a measurement of close circuit voltage (C.C.V.) for the same lots of batteries over the same time interval. For all of the curves, each of the numbers appearing above vertical line extending therebelow represents the number of batteries remaining from the examined lot which were found to exhibit voltage readings within a range of voltages defined by the extent of the noted vertical line. For instance, the lot shown in FIG. 5 commenced with 22 batteries and ended with 18, while the lot depicted in FIG. 4 commenced with 18 batteries and ended with 14. The charts reveal excellent shelf life stability over a relatively extended period of time considering the form of battery involved.

The batteries utilized in developing the charts of FIGS. 4 and 5 were structured as described in connection with FIGS. 1 through 3 and were formed utilizing the following technique, materials and dimensions:

The cathode collector assembly as earlier described in FIGS. 2 and 3 at 20 was formed of a tin coated steel and "Condulon" laminate having a length of 3.112 inches and a width of 2.437 inches. A frame member as at 26a was heat sealed to the Condulon face of the assembly. The frame was formed of polyvinyl chloride having a thickness of 5 mils, an external width of 2.75 inches and a length of 3.420 inches. The internal opening within the frame was formed having a border width of 2.130 inches and a border length of 2.8 inches. Thermal sealing was by impulse technique, temperature at the seal being elevated from room temperature to 275° F and returned to room temperature within an interval of 15 seconds. Predeposited upon the Condulon surface was an electrode formed of a mixture of manganese dioxide and electrically conductive carbon dispersed in a polymeric binder.

A series of three duplex electrodes were preassembled comprising a "Condulon" electrode supporting sheet having a length of 3.112 inches and a width of 2.437 inches and a thickness of 2 mils. One face of the electrode supporting sheet carried a predeposited anode formed of finely powdered zinc and a polymeric binder. The opposite face of the electrode supporting sheet carried a predeposited cathode of manganese dioxide and electrically conductive carbon dispersed in a polymeric binder. The duplex electrode was heat sealed to a polyvinyl chloride frame, dimensioned as that described immediately above, the heat seal being made at the anodecarrying face of the electrode support. Impulse thermal sealing was utilized to attach the frame with the electrode support using the same 15 second interval and temperatures described above.

Over the anode electrode portion of each duplex electrode was deposited an aqueous solution of ammonium chloride/zinc chloride about 4:1 dispersed in a polymeric binder and including a 2 percent by weight addition of mercuric chloride. The electrolyte was deposited using silk screen technique. Over each of the electrolyte dispersions, a separator formed of Kraft paper having a thickness of about 2 mils, a length of 3.112 inches and a width of 2.437 inches was placed in appropriate registry. Following such positioning, a second deposition of the same electrolyte formulation was placed over the separators. The three duplex electrode-separator-electrolyte subassemblies were then combined appropriately with the cathode end cell.

The anode collector assembly was formed of a laminate of tin coated steel and "Condulon" having the above described anode material pre-applied thereto. The anode collector assembly had a length of 3.112 inches and a width of 4.062 inches. A polyvinyl chloride frame having the dimensions of the former identified above was heat sealed about the anode deposition using the 15 second interval impulse technique above described. The extended portion of the widthwise dimension of the assembly was folded back upon itself. Following being coated with the noted electrolyte, the positioning of a separator thereover and a final coating of separator thereover, the assembly was positioned in registry over the battery pile build-up. The pile then was sealed in a vacuum utilzing impulse sealing technique whereby the outer periphery of the polyvinyl chloride frames were sealed together over a 45 second interval under a temperature excursion ranging from room temperature to 500° F and returning to room temperature.

Following heat sealing, the wrap-around portion of the assembly as previously identified in the drawings at 14 was covered with an electrically insulative dual adhesive surface tape and the extended portion was wrapped about battery structure. The thus assembled battery unit then was positioned upon a card as shown in the drawings and affixed thereto utilizing a transparent, electrically insulative adhesive film.

All lots of batteries so constructed, were then stored at 75° F over an extended period of time and periodically tested for open circuit voltage and close circuit voltage. The result of such testing for two lots of batteries is revealed in FIGS. 4 and 5 as above described.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. In a planar battery having a multiplicity of discrete electrically conductive layers arranged in cooperative electical association with one another to form a multicell battery, the improvement comprising:
   continuous frame-type electrically insulative sheet sealing means having a first surface adjacent an inner opening therein thermally bonded to one peripherally disposed surface of each said discrete electrically conductive layer and extending outwardly from the periphery of said electrically conductive layer to define a continuous border sealing portion; and
   discrete, sheet-type separator means positioned intermediate superposed ones of said electrically conductive layers and shaped having a periphery extending beyond said sealing means inner opening, said periphery remaining within said border sealing portion.

2. The improved thin battery of claim 1 in which said separator means is formed of electrolyte permeable paper.

3. The improved thin battery of claim 2 in which said paper is Kraft paper.

4. The improved thin battery of claim 1 in which said frame-type electrically insulative sheet sealing means are formed of sheet polyvinyl chloride.

5. The improved thin battery of claim 2 in which said separator means is formed of Kraft paper having a thickness of about 2.5 mils and said frame-type insulative sheet sealing means is formed of polyvinyl chloride having a thickness of about 5 mils.

6. A laminar battery comprsing:
   discrete, sheet-type electrically conductive thermoplastic electrode supports at least one of which is formed having a predetermined peripheral shape and arranged in superpositioned fashion in combination with electrode material and electrolyte to define at least one electrochemical cell;
   electrically insulative thermoplastic frames, each having an opening defined by an inner border, a first continuous sealing surface extending outwardly from said inner border and thermally sealed with one select peripherally disposed surface of a said electrode support, each said frame being dimensioned to extend beyond said electrode support of predetermined peripheral shape to define a continous second sealing surface, said frame being superpositioned in registry and mutually thermally intersealed at said second sealing surface; and
   discrete, sheet-type separator means positioned intermediate superpositioned ones of said electrode supports and shaped to provide a periphery extending beyond said frame opening but inwardly from said second sealing surface.

7. The laminar battery of claim 6 in which said separator means is a sheet material shaped coextensive with said electrode support of predetermined peripheral shape.

8. The laminar battery of claim 6 in which said separator means is formed of electrolyte permeable paper.

9. The laminar battery of claim 8 in which said paper is Kraft paper.

10. The laminar battery of claim 6 in which said frames are formed of sheet polyvinyl chloride.

11. The laminar battery of claim 7 in which said separator means is formed of Kraft paper having a thickness of about 2.5 mils and said frame is formed of polyvinyl chloride having a thickness of about 5 mils.

12. The laminar battery of claim 6 in which the outwardly disposed ones of said discrete sheet-type electrically conductive electrode supports are formed as current collector assemblies comprising an outwardly facing metal foil coextensive and in electrical bond with the outward facing surface of said electrode support so as to provide a terminal contact surface for said battery.

13. The laminar battery of claim 12 in which one said current collector assembly is configured such that a portion thereof is foldable toward the oppositely disposed one of said current collector assemblies and including means electrically insulating said folded portion from said oppositely disposed collector assembly so as to provide adjacent terminal defining surfaces.

14. The laminar battery of claim 6 in which said electrode material includes positive and negative material, said positive material comprising manganese dioxide active material, said negative material comprises zinc active material, and said electrolyte comprises ammonium chloride and/or zinc chloride.

15. The laminar battery of claim 14 in which said first continuous sealing surface of said electrically insulative frames are sealed thermally to said electrode supports on a surface thereof supporting said negative material.

16. The laminar battery of claim 15 in which said frames are formed of polyvinyl chloride and said separator means are formed of Kraft paper.

* * * * *